United States Patent [19]

Matteuzzi et al.

[11] Patent Number: 4,683,931
[45] Date of Patent: Aug. 4, 1987

[54] MACHINE FOR AUTOMATICALLY ENGRAVING THE GROOVE IN TIRE TREADS

[76] Inventors: Claudio Matteuzzi, Via Pilastrino, 18; Emilio Matteuzzi, Via Serra, 1, both of Calderara di Reno (Bologna), Italy, 40012

[21] Appl. No.: 800,543
[22] Filed: Nov. 21, 1985

[30] Foreign Application Priority Data

Nov. 23, 1984 [IT] Italy .................................. 3631 A/84

[51] Int. Cl.$^4$ ............................................. B29D 30/68
[52] U.S. Cl. ...................................................... 157/13
[58] Field of Search .................... 157/13; 51/DIG. 33, 51/101 R, 50 PC; 82/19; 83/411 R

[56] References Cited

U.S. PATENT DOCUMENTS

| | | |
|---|---|---|
| 2,891,605 | 6/1959 | Love ........................................ 157/13 |
| 3,589,427 | 6/1971 | Love ........................................ 157/13 |
| 4,081,017 | 3/1978 | Appleby et al. ...................... 157/13 |

Primary Examiner—Frederick R. Schmidt
Assistant Examiner—Debra S. Meislin
Attorney, Agent, or Firm—Darby & Darby

[57] ABSTRACT

A machine for automatically engraving the groove in tire treads provided with a first rotary tire-carrying shaft and with a second tool-holding shaft axially movable in a reciprocating manner parallelly to the first shaft, by way of an appropriate motion transmitting gear cascade. The motion transmitting gear cascade is interchangeable, and actuates a cam. A cam follower is driven by the cam and is fastened to a rack. A gear wheel engages the rack and carries as rocker along one of its diameters. A connecting rod pivots on the second shaft and on a slider, which is engageable along the rocker in an adjustable manner.

4 Claims, 2 Drawing Figures

MACHINE FOR AUTOMATICALLY ENGRAVING THE GROOVE IN TIRE TREADS

BACKGROUND OF THE INVENTION

The invention pertains to a machine for automatically engraving the groove in tire treads.

It is known that most tires mounted on currently travelling vehicles have been regenerated, that is to say, they are worn tires that have been top-capped usually by curing.

The new treads are normally available in the form of continuous strips from which the elements to be wound around the cylindrical surface of the worn tire are proportionately cut away.

These treads are sufficiently inexpensive since they are preformed, i.e. already provided with the grooves characterizing them, and in addition their wear is slow.

Unfortunately, however, there are two drawbacks that make the curing of little effectiveness: the type and the hardness of the material from which the tread is made.

In fact, the material used is not suitable for proper curing and furthermore, in order to achieve a longer lifetime, it is harder than the material from which the carcass is made, so that between the tread and the carcass there is relative movement which deteriorates the cure.

However, treads have been recently produced using a material which is well adapted for curing and for tooling and which also has remarkable endurance. The only drawback they have is that they are available without the groove, which groove must be engraved after the curing operation has been carried out, and therefore directly on the tire.

For engraving the treads in the tire, according to the known art, it is possible to use machines substantially provided with a rotary tire-carrying shaft and with a tool-holding shaft. The rotatory motion is derived from the tire-carrying shaft, converted into a reciprocating motion and transmitted axially to the tool-holding shaft.

Said rotatory motion is currently converted into a reciprocating motion by means of kinematic chains driving a crank-and-connecting-rod mechanism powering the tool-holding shaft. And it is exactly in this operation of converting a rotatory motion into a reciprocating motion that resides the great problem which has not yet been successfully solved by the machines of the known art, that is in an appropriate and inexpensive manner.

In fact each stroke of the tool must take place along a rectilinear path while the tire is obviously rotating. With conventional tire cutting machines, however, the tool moves along arcuate lengths that are not in conformity with the requirements.

A further drawback found in these machines resides in that it is only possible to modify the tool speed and therefore the number of the tool strokes but not the length of the tool stroke.

This drawback is very important too because in some cases, for example when tires for earthwork machines are concerned, the engraving must be done over the whole length of the tread and therefore the strokes to be carried out by the tool must be at least as long as the width of the tire.

SUMMARY OF THE INVENTION

The object of the present invention is to eliminate the above mentioned drawbacks. The invention as defined in the claims solves the problem of providing a machine for automatically engraving the groove in tire treads.

The advantages attained by the present invention essentially consist in that by the use of said machine it is possible to make the tool move forward always along rectilinear paths.

A further advantage is due to the fact that by the use of said machine it is possible to modify both the width and the frequency of movement of the tool in order to be able to meet the most different requirements of the market.

BRIEF DESCRIPTION OF THE DRAWINGS

The invention is described hereinafter in more detail with reference to the accompanying drawings showing an embodiment thereof, in which.

DESCRIPTION OF THE PREFERRED EMBODIMENT

Figure 1:
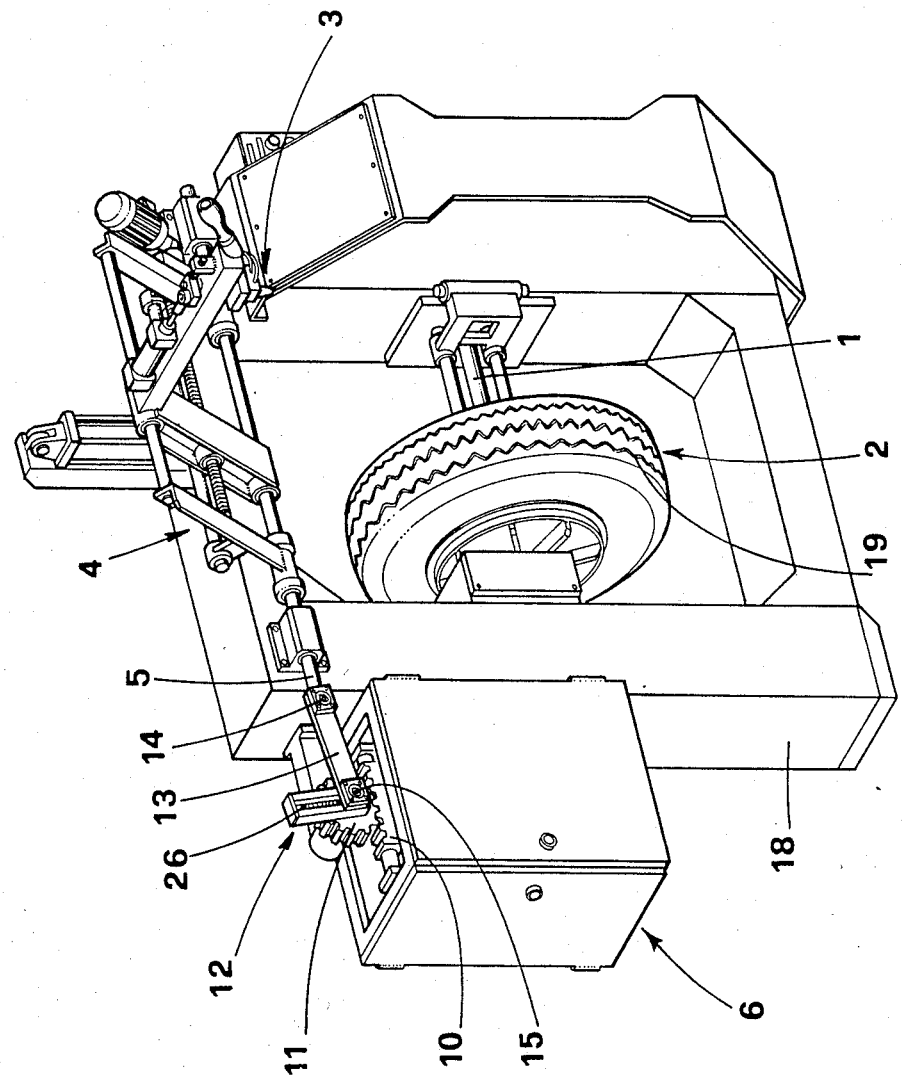
FIG. 1 is a perspective diagrammatic view of the machine according to the present invention seen as a whole.
Figure 2:
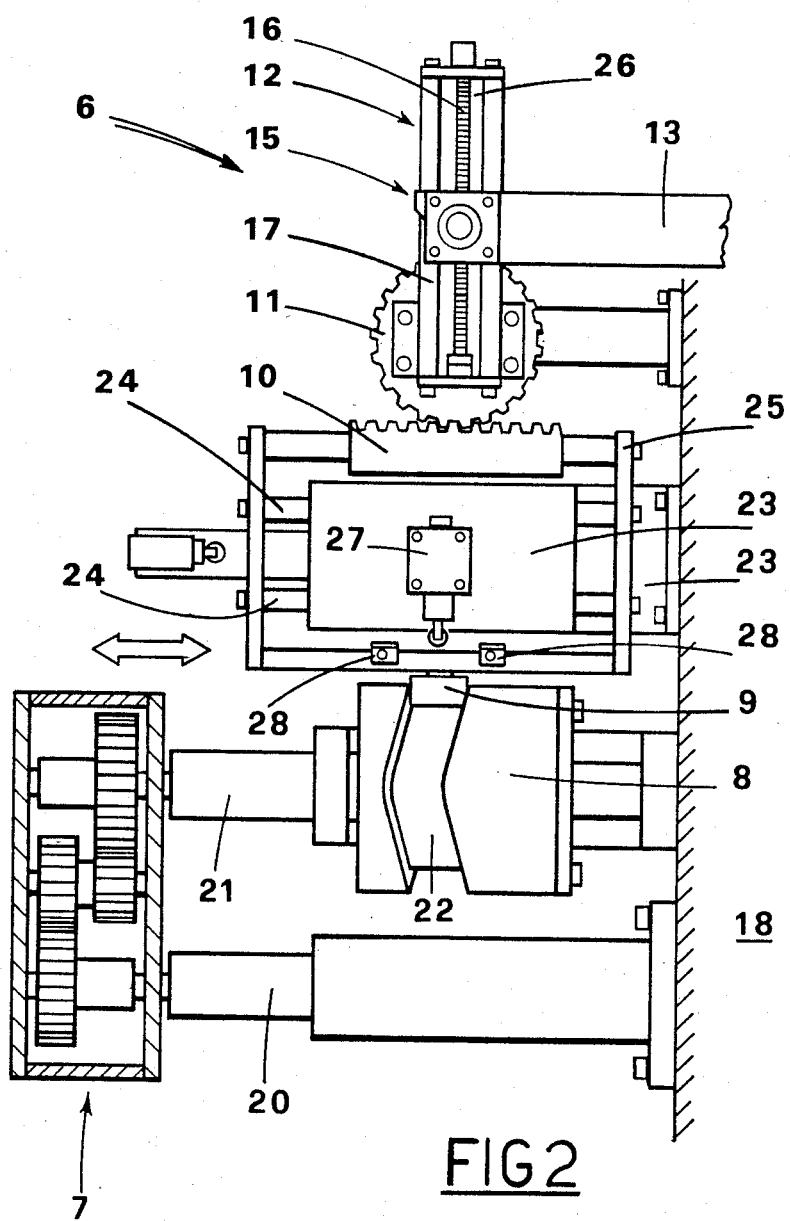
FIG. 2 is a front view of the characterizing members of the machine according to the present invention.

Referring to FIG. 1 it is possible to see that a machine for automatically engraving the groove in tire treads substantially consists of a carrying structure 18, of a shaft 1 carrying a tire 2 and of a shaft 5 holding a tool 3, which is parallel to the first shaft 1.

The tool 3 is carried by the shaft 5 through support means 4 engageable with said shaft 5 and adapted to drivingly rotate the tool 3 for engraving the differently inclined portions of the groove 19. Furthermore, the support means is fixedly located along the shaft 5 depending either upon the region of the tire 2 tread to be engraved or upon the width of the tire 2 itself. The tool 3 is positionable along the width of the tire 2 (see the direction of arrow F1 shown in FIG. 1) by means of an endless screw 50 driven by a motor 51. More particularly, this position is realized relatively along the shaft 5 carrying the tool 3. This is to adjust the tool 3 to realize a groove 19 or 19A or 19B.

The support means 4 (shaped like an angulated from 41 are movable around the axis 5 between two extreme positions. That is, the support means is movable in the direction of arrow F2 shown in FIG. 1 from a lower position in which the cutting tool 3 engages the tire 2, to an upper position, when no grooves 19 are being cut in the tire. This movement is driven by the handle 43 and is guided by a relative double effect piston 42.

The movement of the tool 3 takes place around the vertical axis 31 and is driven by a connecting rod 32 driven by a double effect piston 33.

The shafts 1 and 5, usually horizontal, are supported by the carrying structure 18 and are provided with a rotatory motion and with a reciprocating motion along its axis respectively.

In order to allow these shafts 1 and 5 to rotate following a determined synchronism, the reciprocating motion to the shaft 5 is derived from the rotatory motion of the shaft 1 through motion transmission means 6.

According to the present invention said motion transmission means 6 essentially consists of an interchangeable gear cascade 7, a cam 8 and a rocker 12.

The gear cascade 7 receives the motion from a first hollow shaft 20 powered, through a kinematic mechanism not shown for the sake of simplicity, by the shaft 1 and transmits it to a second hollow shaft 21 on which the cam 8 is rigidly fitted. The input and output shafts in the gear cascade 7 are slidably engaged in the holes of the respective hollow shafts 20 and 21 so that it is possible to change the transmission ratio of the hollow shafts 20 and 21 by merely replacing the gear cascade 7 for a reason to be set forth hereinbelow.

The cam 8 is of cylindrical form and its cylindrical surface is crossed by a cam-shaped race 22 engaging a cam follower 9 carried at its lower part by a frame 25.

The frame 25 is integral to two parallel and horizontally slidable stems 24 that are supported by a block 23 fixedly mounted on the carrying structure 18.

At the upper part of the frame 25 is mounted a rack 10 meshing with a gear wheel 11. The gear wheel 11 is freely carried by the carrying structure 18 and has a rocker 12 fastened along one of its diameters. Preferably, the diameter of the gear wheel 11 along which the rocker 12 is fastened is the one that during the oscillations of the gear wheel 11 itself performs equal angular displacements relative to the vertical.

The rocker 12 is provided with a longitudinal slot 26 engaging a slider 15 having one end of a connecting rod 13 pivoted thereon. On its face oriented towards the front part of the machine the rocker 12 exhibits a graduated scale 17 adapted to be used in association with an index exhibited by the slider 15 for a reason to be set forth hereinbelow. A screw 16 is also shown in the figures by way of example; it is housed inside the longitudinal slot 26 and is axially fixed at its free ends to the ends of the rocker 12. The screw 16 also passes through the slider 15 in a screwable manner so that when it is rotated it causes the slider to slide in an adjustable manner along said longitudinal slot 26.

In addition, at its free end 14 the connecting rod 13 is pivoted on one end of the shaft 5 carrying the tool 3.

A microswitch 27 is also fastened to the block 23; said microswitch acts in combination with two limit stops 28 and is adapted to drive the support means 4 for the tool 3 and to cause the latter to rotate, as previously mentioned. The limit stops 28 carried by the frame 25 correspond to the dead centers of the cam-shaped race 22 and therefore to the end points of the path followed by the cam follower 9. As stated previously, the microswitch 27 is fastened to the block 23 which is joined to the structure 18. The limit stops 28 are carried by the frame 25 which is alternatively moved by the cam 9 between the two dead centers of the cam shaped race 22. When one of the limit stops 28 intercepts the microswitch 27, it alternatively drives the movement of the piston 33 and so the pivoting of the tool 3.

With such a machine it is possible to vary the frequency or number of the oscillations (zigzag) of the tool 3 by replacing the gear cascade 7 with another having such a transmission ratio, between the input and output shafts, so that it enables the tool 3 to accomplish the required number of oscillations.

On the contrary, by varying the position of the slider 15 along the rocker 12, which position is shown on the graduated scale 17 provided on the rocker 12 itself, it is possible to modify the diameter of the circumference along which the slider 15 moves, thereby varying the stroke thereof and, as a result, the stroke of the shaft 5 carrying the tool 3.

Before the machine is started it is necessary to position the support means 4 along the shaft 5 so that the tool 3 can execute the groove 19 in a determined region of the tire 2 tread. This positioning is obviously carried out, although automatically, at the end of each groove 19, unless the whole width of the tire 2 thread is concerned with said groove 19.

When the machine is operative and every time the cam follower 9 reaches a dead center of the cam shaped race 22 in cam 8, the microswitch 27 acts in combination with a limit stop 28 and sends a command to the support means 4 which causes the tool 3 to rotate so that the latter is ready to execute the groove 19 on the tire 2 tread along a direction that is inclined relative to the preceding and just finished one.

Substantially, for engraving a groove 19 it is necessary to set the stroke length of the shaft 5 depending upon the position of the slider 15 along the rocker 12; the transmission ratio between the hollow shafts 20 and 21 depending upon the gear cascade 7; the inclination width of the tool 3; and the location of the support means 4 along the shaft 5.

Obvious modifications and/or improvements are considered to be within the scope of the appended claims.

What is claimed is:

1. A machine for automatically engraving a groove in a tire tread, which comprises:
   a rotatable first shaft for supporting a tire, the first shaft being rotatably driven at a predetermined angular speed;
   a reciprocatingly slidable, axially movable second shaft, the second shaft being disposed parallel to the first shaft;
   a cutting tool for engraving a groove in a tire tread supported by the first shaft;
   means for supporting the cutting tool, the tool supporting means being fixedly mounted on the second shaft and being movable therewith, the cutting tool being mounted on the tool supporting means; and
   means for effecting a reciprocatingly motion to the second shaft in response to a rotational movement of the first shaft, the motion effecting means including an interchangeable gear cascade coupled to the first shaft, the gear cascade including an output shaft rotatable in response to the rotation of the first shaft, a cam mounted on the output shaft and rotatable therewith, the cam having a race formed in a surface thereof, a cam follower at least partially received by the race and reciprocatingly movable in a direction parallel to the axis of the output shaft in response to the rotational movement of the cam, a rack operatively coupled to the cam follower and reciprocatingly movable in response to the movement of the cam follower, a gear wheel engaging the rack and rotatable in response to the reciprocating movement of the rack, a rocker fixedly mounted on the gear wheel and extending radially therefrom, the rocker being angularly displaceable in response to the rotational movement of the gear wheel, a slider mounted on the rocker, and a connecting rod, the connecting rod having a first end coupled to the slider and a second end opposite the first end and coupled to the second shaft whereby angular movement of the rocker causes the second shaft to move axially.

2. A machine as defined by claim 1, wherein the slider is adjustably positionable longitudinally along a portion of the length of the rocker.

3. A machine as defined by claim 2, wherein the rocker further includes a rotatable screw mounted thereon and disposed in the longitudinal direction of the rocker, the slider engaging the screw and being adjustably positionable along a portion of the length of the rocker in response to the rotation of the screw.

4. A machine as defined by claim 3, wherein the rocker further includes a graduated scale mounted longitudinally thereon along a portion of the length thereof.

* * * * *